W. I. FANCHER.
EYEGLASSES AND MOUNTING.
APPLICATION FILED APR. 15, 1913.
1,107,598.
Patented Aug. 18, 1914.
2 SHEETS—SHEET 1.
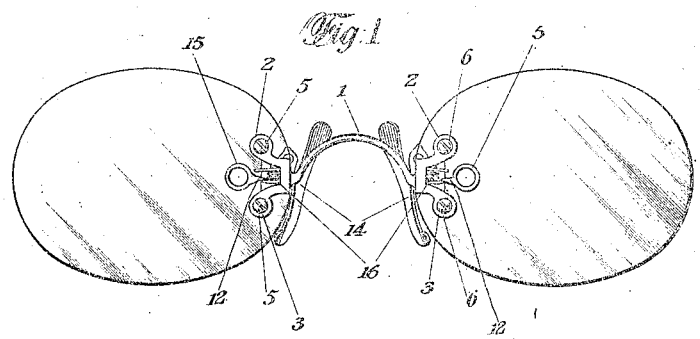
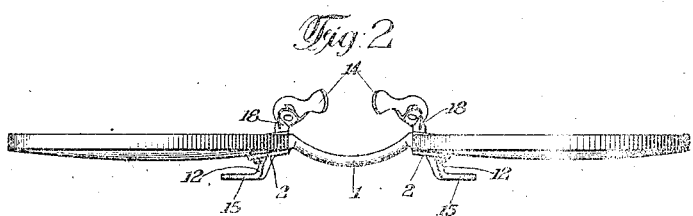
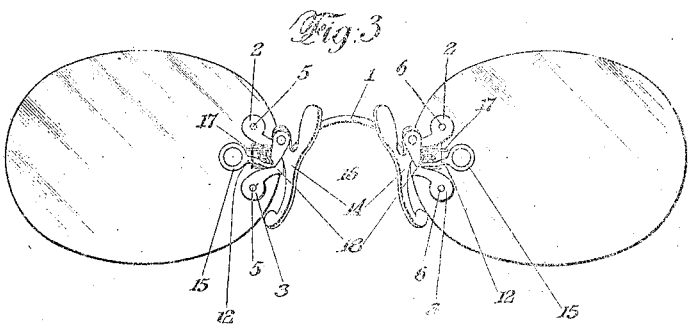

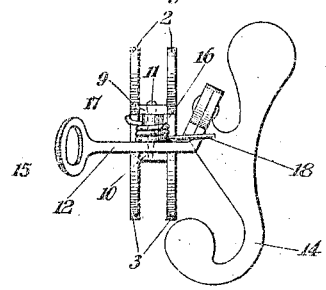
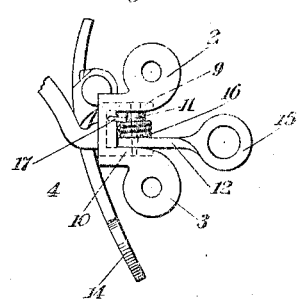
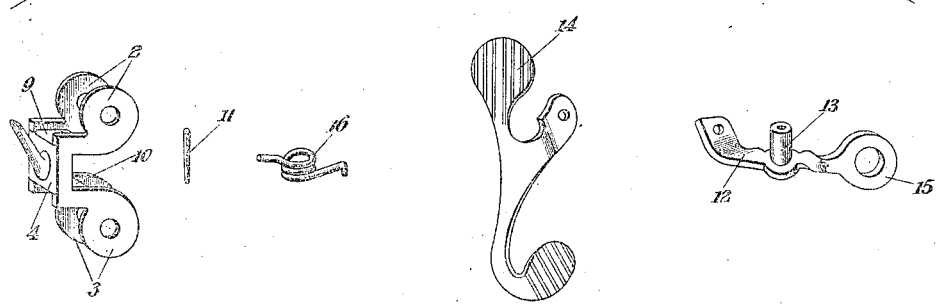
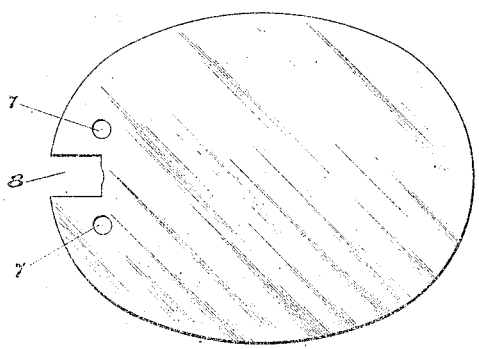

UNITED STATES PATENT OFFICE.

WARD IRVING FANCHER, OF GLEN COVE, NEW YORK.

EYEGLASSES AND MOUNTING.

1,107,598.   Specification of Letters Patent.   Patented Aug. 18, 1914.

Application filed April 15, 1912. Serial No. 690,710.

*To all whom it may concern:*

Be it known that I, WARD I. FANCHER, of Glen Cove, in the county of Nassau, and in the State of New York, have invented a certain new and useful Improvement in Eyeglasses and Mountings, and do hereby declare that the following is a full, clear, and exact description thereof.

The object of my invention has been to provide an eye-glass and mounting which shall have, among others, any or all of the following advantages: that it shall permit the use of relatively large lenses; that it shall reduce the pupilary distance of the lenses without in any manner interfering with, or rendering less effective, the bridge and parts which engage the nose; that it shall hold the glasses securely and prevent any movement in a vertical plane, relative to the bridge, even though there should be a slight looseness of the screws or corresponding fastening parts; that it shall be so constructed that the pivots of the pivoted nose-engaging parts cannot escape from position so long as the lenses are secured in position; that it shall permit change in the vertical pupilary position relative to the bridge by a mere rearrangement of the same parts and without requiring extra parts; that it shall enable the springs of spring-pressed nose-engaging parts to be more readily assembled than heretofore; and to such ends my invention consists in the eye-glasses and mounting hereinafter specified.

In the accompanying drawings Figure 1 is a front elevation of an eye-glass mounting and lenses embodying my invention; Fig. 2 is a plan view of Fig. 1; Fig. 3 is a rear elevation of Fig. 1; Fig. 4 is an enlarged end elevation of the mounting itself; Fig. 5 is an enlarged front elevation of the mounting itself; Fig. 6 is a view showing the parts of the mounting separated; and Fig. 7 is a view of a lens alone.

It is desirable that large lenses be used in eye-glasses in order that the lens shall intercept the line of vision, even though the eyes be turned sidewise or up and down, and without turning the head, but the ordinary eye-glass mounting seriously limits the size of the lens which may be used because its parts necessarily hold the glasses widely apart. It is also desirable that the pupilary distance of the lenses shall be the same as that of the eyes, regardless of the size of the nose, but with the ordinary eye-glass mounting the pupilary distance of the lenses is determined by the width of the eye-glass mounting, and the latter is determined by the width of the nose, so that the question whether or not the pupilary distance of the lenses is the same as that of the eyes depends upon the accident of the width of the nose. It is to overcome these objections to the ordinary eye-glass mounting, as well as others which will be mentioned later, that I have produced my invention.

The embodiment of my invention illustrated in the accompanying drawings, is the best embodiment thereof known to me, but it is to be regarded as typical only of many possible embodiments, and my invention is not to be limited to the form shown. I am also aware that the various features of my invention may be used separately, and with other forms of mounting than that shown, and my invention is not to be limited to a mounting in which all of the features are present.
In the illustrated embodiment, the bridge 1 carries at each end upper and lower pairs of ears 2 and 3, respectively, which ears are preferably formed from a sheet of metal with a plate 4 that is secured to the end of the bridge. The eye-glass is secured between the said pairs of ears, as by screws 5 and 6, respectively, the glass for that purpose being provided with two holes 7 and 8, respectively. In order that the glass may approach the nose as closely as possible, and thus brings its pupilary center inward, it is provided with a notch 8, which receives within it the plate 4. Each plate 4 is provided with upper and lower horizontal ears 9 and 10 which project in the plane of the lens, away from the bridge, and such ears carry a vertical pivot-pin 11 which is seated in holes in the ears and held in place by the upper and lower walls of the notch in the lens, the said notch being made deep enough to receive the said ears. The pivot-pins are for the purpose of pivoting a spring-pressed lever carrying a nose guard. Each lever 12 carries a sleeve 13, preferably projecting from one side only of the lever, the said sleeve being journaled on the said pivot-pin. The rear end of the lever has a nose guard 14 pivoted on it in the usual manner, and the front end of the lever is formed into a handle 15 adapted to be engaged by the thumb or finger in applying the glasses to the nose.

A spring 16 has its coil mounted upon the said sleeve and has one end 17 engaging a stationary part, such as the lens, and its other end 18 engaging the lever so that the spring tends to throw the nose guards against the nose.

My eye-glass and mounting have, among others, the following advantages: As the lenses approach closely to the nose, not being held away by the bridge construction, lenses of large diameter can be used. For the same reason the pupilary distances of the lenses can be made the same as those of the eyes, within much wider limits than with the ordinary eye-glass mounting. By simply reversing the levers so that the sleeves are on the lower sides of the levers, instead of the upper sides, as shown in the drawings, so the vertical pupilary position of the lenses can be varied. If the levers are so reversed the nose guards would usually be bent anew to fit the nose, or they could be reversed on the levers. The sleeves afford a long firm bearing for the levers, which will not be materially loosened by any ordinary wear. The lenses are secured to the bridge at two separate points (by the two separate screws) so that no ordinary looseness of the parts will permit any vertical movement of the lens relative to the mounting, and a very firm securement is obtained. The pivot-pins of the levers (being so retained above and below by the walls of the notches in the lenses) can not come loose unless the screws be taken out of the lenses. As the springs can be secured upon the levers for the purpose of assembling, merely by placing them upon the sleeves, the placing of the pivots in position is a relatively simple and easy operation. Notwithstanding all of the above advantages, the extreme width of my eye-glass mounting is not greater than that of the ordinary mounting.

The levers *per se* are not claimed in this patent but will be made the subject of a separate patent.

I claim:

1. Eye-glasses consisting of the combination of lenses, a bridge and nose engaging levers, said lenses having notches in the edges nearest said bridge, and said levers being mounted in said notches.

2. Eye-glasses consisting of the combination of lenses, a bridge and nose engaging levers, said lenses having notches in the edges nearest said bridge, and the fulcrums of said levers being mounted in said notches.

3. Eye-glasses consisting of the combination of lenses and a bridge, said bridge having upper and lower ears secured to each end thereof, a pin passing through each of said pairs of ears, nose engaging levers mounted upon said pins and between said ears, and lenses having notches in which said ears are received.

4. Eye-glasses consisting of the combination of lenses and a bridge, said bridge having upper and lower pairs of ears secured to each end thereof, pins passing through each of said pairs of ears and the corresponding lens, upper and lower horizontal ears secured to each end of said bridge and projecting into a notch in the edge of the corresponding lens, pins mounted in said ears, and nose engaging levers mounted on said pins.

5. Eye-glasses consisting of the combination of lenses and a bridge, said bridge having upper and lower pairs of ears secured to each end thereof, pins passing through each of said pairs of ears and the corresponding lens and nose-engaging levers mounted between said ears and within the peripheries of said lenses.

6. An eye-glass mounting consisting of a bridge having means for supporting the lenses, and having a pair of horizontally projecting ears at each end of the bridge, a journal pin mounted in each of said pairs of ears, and a nose-engaging lever journaled on said pin, said pairs of horizontally projecting ears being received in a notch in the corresponding lens.

7. An eye-glass mounting consisting of a bridge having means for supporting the lenses, and having a pair of horizontally projecting ears at each end of the bridge, a journal pin mounted in each of said pairs of ears, a nose-engaging lever journaled on said pin, and a lens notched to fit over said ears, thereby securing said pin in its ears.

8. Eye-glasses consisting of lenses and a bridge, said bridge having upper and lower pairs of ears at each end and pins passing through said ears and said lenses, said bridge also having horizontally projecting ears carrying a pivot-pin, said lenses being notched to fit over said last-mentioned ears, and nose-engaging levers mounted on said pivot-pins.

In testimony that I claim the foregoing I have hereunto set my hand.

WARD IRVING FANCHER.

Witnesses:
ELLWOOD VALENTINE,
M. E. MONTFORT.